H. C. BUSBY.
SYSTEM OF UTILIZATION OF WINDMILL POWER.
APPLICATION FILED APR. 9, 1909.
943,000.
Patented Dec. 14, 1909.
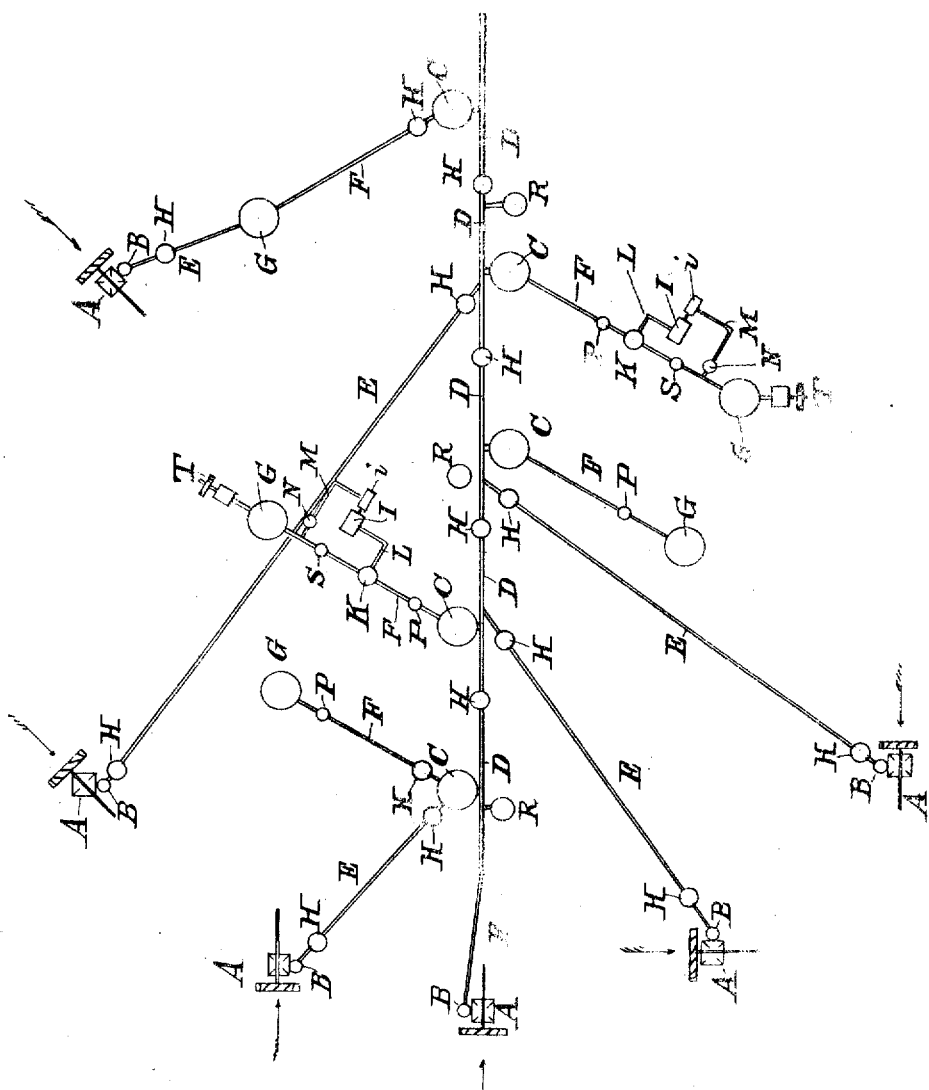
Witnesses:
 E. B. Knudsen
 A. S. Peterson
Inventor
 Homer C. Busby
By Michael J. Stark
 Attorneys.

UNITED STATES PATENT OFFICE.

HOMER C. BUSBY, OF BIRMINGHAM, ALABAMA.

SYSTEM OF UTILIZATION OF WINDMILL-POWER.

943,000.      Specification of Letters Patent.     Patented Dec. 14, 1909.

Application filed April 9, 1909. Serial No. 488,928.

*To all whom it may concern:*

Be it known that I, HOMER C. BUSBY, a citizen of the United States, and resident of Birmingham, in the county of Jefferson and State of Alabama, have invented certain new and useful Improvements in a System of Utilization of Windmill-Power; and I do hereby declare that the following description of my said invention, taken in connection with the accompanying sheet of drawings, forms a full, clear, and exact specification, which will enable others skilled in the art to which it appertains to make and use the same.

This invention has general reference to an improved system of utilizing windmill power; and it consists, essentially, in the novel and peculiar combination of parts and details of construction, as hereinafter first fully set forth and described, and then pointed out in the claims.

The drawing already referred to illustrates a diagrammatic plan of this improved system.

The object of this invention is the utilization of the power of a series of windmills located at various points in a certain predetermined territory, by causing these windmills to operate air-compressors at these windmill stations and to convey the compressed air by a system of piping to a series of storage tanks and to supply a series of consuming stations in this territory with compressed air from these storage-tanks to operate compressed-air motors at the consuming stations for manufacturing and other purposes.

It is well known that the wind, or air-currents in the atmosphere are variable at different, and often adjacent, places, and that while there may be at certain locations a strong wind, there may be no wind at all at other near-by points. It, therefore, follows that when a manufacturing plant is fitted with its own windmill power, there are many interruptions in the power-plant owing to lack of wind, and that even when such manufacturing plant is provided with compressed-air storage capacity, such stoppages are nevertheless more or less frequent. My system is, therefore, designed to avoid these stoppages by the coöperation of a series of windmills located within a certain radius of manufacturing plants to compress air and to supply one or more main storage tanks with this compressed air and to run from such storage tanks piping to the various consuming plants or stations to operate compressed-air motors; each consuming station being supplied with a local compressed-air storage tank and a local compressed-air motor and air-compressor adapted to take air from the surrounding atmosphere and compress it into the local storage tank whenever it will be necessary to do so, such local compressed-air motor being operated by air supplied from the main supply whenever the main supply should fall below the normal pressure required at the consuming station.

In this system there are placed in the branch supply piping, automatically operating valves which, when the pressure in the main storage tanks and supply pipes falls below the required normal pressure at the consuming stations, will instantly close the connection between the main, and the local storage tanks, and turn the compressed air into a by-pass of the branch supply-pipe to the local air-compressor operated by the local compressed-air motor, to take air from the surrounding atmosphere and compress it into the local storage tank to the normal pressure, until the main pressure shall again exceed the normal pressure, when the automatic valve will close the by-pass and open the direct connection with the local storage tank. There are, in this system also pressure regulators, located near the local power-supplying motor, to reduce any higher pressure to the normal pressure required at the local station, and check-valves in the by-pass to prevent the local air-compressors from operating as motors when the consuming station is being supplied with compressed air from the main supply. This series of windmills is permitted to operate continuously and uninterruptedly as long as one or more are in the wind, so that while at some windmill stations there may be calm and the windmills out of action, others in the series may be operating, it being reasonably certain that at no long period of time will all the windmills in the series be inoperative.

A in the drawings designates a series of windmills located within a certain territory, each windmill being provided with a suitable air-compressor B, operated by said windmill.

C are a series of compressed-air storage tanks located at convenient points within the territory embraced by this system, and D are a series of sections of a main supply pipe-system.

E are pipes connecting the main air-compressors at the windmills with the respective sections of the main supply pipes D.

F are branch-pipes connecting the main storage tanks or the main supply pipes with auxiliary storage tanks located at the various consuming plants or stations where the compressed air is to be utilized for furnishing power &c.

G are the auxiliary storage tanks at the consuming plants.

H are stop-valves placed in the main line D to cut out any section of said main line should such become necessary for any reason whatever.

I are compressed-air motors, and $i$, air-compressors located at the consuming stations.

K are automatically operating valves located in the branch supply pipes F; and L are by-passes connecting the branch-pipes with the local storage tanks through local compressed-air motors I and piping M.

N are check-valves in the pipes M adapted to prevent air from the local tanks from entering the local air-compressors and causing them to operate as compressed-air motors when the local storage tanks are being supplied from the main supply.

P are shut-off valves to cut off any consuming station from the main supply whenever necessary or desirable.

R are drains or automatic traps in the main line, and also in the branches, when necessary, to drain the lines from water that may collect at the low points in said lines.

S are the reducing valves, and T are the local motors adapted to furnish the power for the manufacturing plants.

The operation of this system is substantially, as follows: Assume that the consuming stations require a steady pressure of 150 lbs. of compressed air. The windmills being in operation, their air compressors will pump compressed air into the main supply and branches to any high pressure that they may be adapted to pump, which high pressure will be reduced at the consuming motors to the normal pressure required. Should, however, by reason of insufficient air-supply from the windmills the pressure in the main supply fall below the normal pressure of 150 lbs. per square inch, the automatically-operating valves K will immediately shut off the air supply in the branches F to the tanks G and direct the same into the by-pass and to the compressed-air motors I to operate the latter to compress air by the air-compressors $i$ which take air from the surrounding atmosphere and pump it into the local tanks, (or from the main-supply by piping, not shown, and further compress the same to the required normal pressure). As soon as the pressure in the main supply exceeds the normal pressure of the consuming stations, the valves K will open the branch pipes F to the local tanks and shut off the supply to the by-pass L M. It will thus be observed that this system of utilizing the power obtainable from a series of windmills each supplied with its own means for compressing air, operates practically automatically, and that there is scarcely a limit to the number of windmills and consuming stations that may be installed in this system. It will be further observed that all the main tanks and supply pipes and branches are in intercommunication, so that there is a practically uniform air-pressure at all the various lines and stations, and that it is impossible for any one consuming station to be better supplied with compressed air than the others, while by the introduction of the local air-compressing plants, each consuming station may provide for its own standard or normal pressure by using the common supply as a means for operating the local air-compressing plant.

I have heretofore stated that the valves K are automatically operating to direct the compressed-air supply either directly to the auxiliary storage tanks G, or indirectly through the by-passes and the auxiliary compressed-air motors and auxiliary air-compressors, but I desire it understood that instead of automatically operating valves, I may employ hand-operated valves, or three-way valves or analogous means for changing the flow of the air. So may a single consuming station or plant be operated by my system including a series of windmills each having its own air-compressor operated by said windmill, and delivering its compressed air to a common storage tank or tanks, or intercommunicating tanks, to be utilized at such plant. These and many other details of construction may be modified or changed to adapt this system to the varying topography of the territory in which the system may be installed, without departing from the scope of my invention.

It is evident that the various compressed-air storage tanks and pipe lines may be supplied with safety-valves set to a predetermined pressure so that, should the supply of compressed air exceed the consumption at the consuming stations, these safety-valves will permit the escape of such surplus air and prevent damages to the various tanks, pipings and machinery. The shut-off valves H may also be placed into each of the various pipings so as to enable any section thereof being cut out whenever found necessary or desirable.

Having thus fully described this inven- tion, I claim as new and desire to secure to me by Letters Patent of the United States—

1. In a system of utilizing wind-power for manufacturing and analogous purposes, the combination of a series of windmills each of which is provided with an air-compressor operated by said windmill; an air-storage tank; piping connecting each air-compressor with said tank; a compressed-air motor connected by a supply-pipe with said storage tank and adapted to utilize the compressed air from the air-compressors at said windmill; a pressure regulator between the tank and the motor in said supply pipe; a by-pass in said supply-pipe; a valve in said supply-pipe adapted to direct the compressed air either directly to said motor or indirectly through said by-pass, and an auxiliary compressed-air motor and auxiliary air-compressor in said by-pass.

2. A system of utilizing wind power, including, in combination, a series of windmills each of which is provided with an air-compressor operated by one of said windmills, main storage tanks; piping to connect these compressed air storage tanks with the air-compressors at the windmills; auxiliary compressed-air storage tanks; piping to connect the main storage tanks with the auxiliary storage tanks; a by-pass in said last-named piping; a compressed-air motor in said by-pass and an air-compressor operated by said motor; there being a valve in the said piping adapted to direct the flow of compressed air in said piping either directly into the auxiliary compressed air storage tank, or indirectly through the by-pass.

3. A system of utilizing wind power, including, in combination, a series of windmills each of which is provided with an air-compressor operated by said windmill; main air-storage tanks; piping connecting these storage tanks with the air-compressors at the windmills; auxiliary air storage tanks; piping to connect the auxiliary storage tanks with the main storage tanks; automatically operating valves in these pipes; a by-pass in each of these pipes, said automatically-operating valves being adapted to direct the flow of air from the piping into the by-pass; compressed-air motors in said by-passes and air-compressors connected with said motors and operated thereby; pressure regulators in said piping, and check-valves in the by-passes to prevent the auxiliary air-compressors from operating as motors, as described.

4. A system of utilizing wind power for manufacturing and analogous purposes, comprising, in combination, a series of windmills located at various points within a predetermined territory, each of said windmills being provided with an air-compressor operated by said windmill; main compressed-air storage tanks; piping connecting said main storage tanks with the air-compressors at the windmills; piping to connect these main storage tanks with each other; a series of consuming stations; auxiliary compressed air storage tanks at said consuming stations; branch-pipes connecting the auxiliary storage tanks with the main supply-pipes and tanks; compressed-air motors at each consuming station and adapted to be operated by the compressed air from the auxiliary storage tanks; by-passes in said branch-pipes; auxiliary compressed-air motors in said by-passes and auxiliary air-compressors operated by said auxiliary compressed-air motors to force compressed air into said auxiliary storage tanks; automatically-operating valves in said branch piping and connected with said by-passes to direct the flow of compressed air from the main supply into said by-passes; pressure-regulators in said piping, and check-valves in said by-passes to prevent the auxiliary air-compressors from being operated as motors when the flow of compressed air from the main supply is directly through the branch pipes to the local compressed-air motors.

In testimony that I claim the foregoing as my invention, I have hereunto set my hand in the presence of two subscribing witnesses.

H. C. BUSBY.

Witnesses:
MICHAEL J. STARK,
A. G. PETERSON.